(12) United States Patent
Sakurai

(10) Patent No.: US 6,829,388 B1
(45) Date of Patent: Dec. 7, 2004

(54) SYSTEM OF DETECTING ROAD WHITE LINE, METHOD FOR DETECTING ROAD WHITE LINE AND STORAGE MEDIUM STORING PROGRAM FOR DETECTING ROAD WHITE LINE

(75) Inventor: Kazuyuki Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 525 days.

(21) Appl. No.: 09/655,765

(22) Filed: Sep. 5, 2000

(30) Foreign Application Priority Data

Sep. 3, 1999 (JP) .......................................... 11-249711

(51) Int. Cl.$^7$ ................................................ G06K 9/48
(52) U.S. Cl. ...................... 382/199; 340/435; 340/937; 348/119; 348/142; 348/148; 382/103; 382/104; 382/202
(58) Field of Search ................................ 382/105, 104, 382/181, 190, 199, 202–203, 266, 274–275; 348/119, 118, 142–143, 148; 340/435, 937

(56) References Cited

U.S. PATENT DOCUMENTS

| | | | | |
|---|---|---|---|---|
| 5,359,666 A | * | 10/1994 | Nakayama et al. | ......... 382/104 |
| 5,555,555 A | | 9/1996 | Sato et al. | |
| 5,739,848 A | * | 4/1998 | Shimoura et al. | ........... 348/119 |
| 6,163,022 A | * | 12/2000 | Yasui et al. | ............... 250/208.1 |
| 6,493,458 B2 | * | 12/2002 | Yasui et al. | ................. 382/104 |
| 6,546,118 B1 | * | 4/2003 | Iisaka et al. | ................ 382/104 |
| 6,549,642 B1 | * | 4/2003 | Sakurai | ...................... 382/104 |
| 6,590,521 B1 | * | 7/2003 | Saka et al. | ..................... 342/70 |
| 6,593,960 B1 | * | 7/2003 | Sugimoto et al. | ........... 348/148 |

FOREIGN PATENT DOCUMENTS

| | | |
|---|---|---|
| EP | 0626655 A2 | 11/1994 |
| JP | 5-347000 A | 12/1993 |
| JP | 6-24035 | 3/1994 |
| JP | H7-78234 | 3/1995 |

OTHER PUBLICATIONS

Jin–Chuan Hsu et al., "Estimation of previewed road curvatures and vehicular motion by a vision–based data fusion scheme," Machine Vision and Applications 9:179–192 (1997).

* cited by examiner

*Primary Examiner*—Bhavesh M. Mehta
*Assistant Examiner*—Gregory Desire
(74) *Attorney, Agent, or Firm*—Sughrue Mion, PLLC

(57) ABSTRACT

A system and method are provided which are capable of reliably and effectively detecting a white line in an upper region of a road image by dividing the road image into, at least, two regions positioned up and down and using a result from a detection of the white line in a lowest region where the road image is less affected by noise. When a road surface is planar, both intersections of straight lines, by which left and right white lines are approximated, in a lowest region out of regions, positioned up and down, obtained by dividing a road image containing left and right white lines drawn in parallel on the road surface and intersections of straight lines, by which left and right white lines are approximated in an upper region of out of the two regions existing on one horizontal line. The left and right first straight lines, by which the left and right white lines are approximated, are detected in the lowest region and a horizontal line is calculated from a first vanishing point being the intersection of the left and right straight lines, and based on a characteristic that the intersection of the left and right straight lines, by which the left and right white lines are approximated, are approximated in the upper region, existing on the horizontal line, the intersection is detected and straight lines, by which the left and right white lines are approximated, is obtained in the upper region.

21 Claims, 12 Drawing Sheets

SYSTEM OF DETECTING ROAD WHITE LINE, METHOD FOR DETECTING ROAD WHITE LINE AND STORAGE MEDIUM STORING PROGRAM FOR DETECTING ROAD WHITE LINE

BACKGROUND OF THE INVENTION

1. Field of the Invention

The present invention relates to a system of detecting a road white line contained in a road image by processing the road image, a method for detecting a road white line contained in a road image by processing the road image and a storage medium storing a program for detecting a road white line contained in a road image by processing the road image.

2. Description of the Related Art

Research and development of technology for detecting a road white line are being pursued by which right and left road white lines indicating both ends of a travelling lane are to be detected from a road image obtained through an image pickup of a road in front of a vehicle by using a road image inputting device so that the technology can be applied to automatic travelling of an automobile. One problem which arises often when the road white line is to be detected is that a more distant portion, that is, a more upper portion on the road image is affected much by noise caused by insufficient resolution or images of other vehicles.

To solve this problem, methods are proposed in which the road image is divided into, at least, two regions positioned up and down and results obtained in a lower region where the road image is affected less by noise are used for detecting the road white line in an upper region on the road image. One example of these conventional methods is disclosed in Japanese Patent Publication No. Hei6-24035. In the method disclosed therein, a road image is divided into, at least, two regions including a lower and upper region and, to decide a pair of straight lines having a greatest probability of defining a travelling road, using known information about a width of the travelling road, by selecting out of many and unspecified groups of straight lines detected by Hough transformation after edge extraction in each of the two regions, a pair of straight lines to be defined in the upper region is selected from groups of straight lines passing near an upper end of the pair of straight lines defined already in the lower region.

In the road image, generally, since the road image in the upper region is more affected by noise and has less resolution than in the lower region, detection of the white line in the upper region is difficult. In the conventional technologies described above, by selecting the pair of straight lines to be defined in the upper region from groups of straight lines passing near the upper end of the pair of straight lines defined already in the lower region, the detection of the white line is made somewhat easy. However, since, in the upper region, the pair of straight lines having the greatest probability of defining the travelling road, using known information about the width of the road, are determined by selecting out of many and unspecified groups of straight lines detected by Hough transformation after the edge extraction in a same manner as in the lower region, an obtained image is not resistant against noise and the method is not effective for detection. If the road image is divided into three and more regions in particular, the road image in the most upper region is affected more by noise, it is very difficult to decide the pair of straight lines having the greatest probability of defining the travelling road by selecting out of many and unspecified groups of straight lines.

SUMMARY OF THE INVENTION

In view of the above, it is an object of the present invention to provide a system and method capable of reliably and effectively detecting a white line in an upper region of a road image by dividing the road image into, at least, two regions positioned up and down and using a result from detection of the white line in a lowest region where the road image is less affected by noise. It is another object of the present invention to provide a system and method capable of reliably and effectively detecting the white line in the upper region even if the road image is divided into many regions positioned up and down.

According to a first aspect of the present invention, there is provided a road white line detecting system for processing a road image to detect a white line in the road image including:

a first means for detecting left and right straight lines by which left and right white lines are approximated in a lowest region out of two regions positioned up and down obtained by dividing the road image;

a second means for calculating a horizontal line from a first vanishing point being an intersection of the left and right first straight lines; and a third means for detecting straight lines by which the left and right white lines are approximated in a region other than the lowest region, by detecting an intersection based on a characteristic that the intersection of left and right straight lines, by which the left and right white lines are approximated, exists on the horizontal line in a region other than the lowest region in the road image.

In the foregoing, a preferable mode is one wherein the third means includes a means for detecting the second vanishing point on the horizontal line based on a characteristic that, at least, in a region being adjacent to the lowest region out of regions other than the lowest region in the road image, intercepts at lowest ends of left and right second straight lines by which left and right white lines in the region being adjacent to the lowest region are approximated, exist on the left and right first straight lines and the second vanishing point being an intersection of the left and right second straight lines exists on the horizontal line.

Also, a preferable mode is one wherein the third means includes a means for predicting an intersection of straight lines by which left and right white lines are approximated, in an upper region other than the lowest region and not being adjacent to the lowest region in the road image, based on an amount of displacement, on the horizontal line, between intersections of straight lines by which left and right white lines in two or more regions below the upper region are approximated.

Also, a preferable mode is one that wherein includes a means for extracting, from the road image, a sequence of points existing on left and right white lines as a sequence of white line featuring points, together with a white line filter value showing similarity to the white line featuring point and wherein the first means includes a means for detecting straight lines by which the sequence of white line featuring points is approximated using a least squares method, with weight assigned to the white line filter value, for left and right sides, as line approximation of white lines and wherein the third means includes a means for detecting the intersection, on the horizontal line, of left and right second straight lines by which the sequence of white line featuring points in the region being adjacent to the lowest region is approximated using the least squares method, for both left and right sides, with weight assigned to the white line filter value and using upper end points, in the lowest region, of the left and right first straight lines as intercepts at their lowest ends in the region adjacent to the lowest region.

In the above configuration, if a road surface is planar, both an intersection obtained by extended straight lines by which left and right white lines in the lowest region out of regions obtained by dividing the road image including left and right white lines drawn in parallel on the road surface are approximated and the intersection obtained by extended straight lines by which left and right white lines in the upper region are approximated, exist on one line (in this specification, the one line is referred to as a "horizontal line"). Even when the road image is divided into more regions positioned up and down, intersections of extended straight lines by which left and right white lines in each region are approximated, exist on a same horizontal line and this is true even if the road surface curves. Though it is impossible that the road surface is completely planar in a real world, in a case of the road such as a highway having less slopes, no big error would occur even when the road surface seen within an image range obtained by an image pickup is approximated by a plane. According to the present invention, by detecting left and right first straight lines by which left and right white lines are approximated in the lowest region out of the two regions positioned up and down obtained by dividing the road image, by detecting the horizontal line being the intersection of left and right first straight lines and by detecting the intersection based on a characteristic that the intersection of left and right straight lines by which left and right white lines are approximated in the region other than the lowest region in the road image exists on the horizontal line, straight lines by which left and right white lines in regions other than the lowest region are approximated, are detected. This allows the white line in the region other than the lowest region to be detected only by calculating position of the horizontal line already detected, thus enabling reliable and effective detection of the white line in the region other than the lowest region in the road image.

According to a second aspect of the present invention, there is provided a road white line detecting method for processing a road image to detect a white line in the road image including:

a step (a) of detecting left and right first straight lines by which left and right white lines are approximated in a lowest region out of, at least, two regions positioned up and down obtained by dividing the road image;

a step (b) of calculating a horizontal line from a first vanishing point being an intersection of the left and right first straight lines; and a step (c) of detecting straight lines by which left and right white lines are approximated in regions other than the lowest region, by detecting an intersection based on a characteristic that the intersection of left and right straight lines by which left and right white lines are approximated in the region other than the lowest region in the road image, exists on the horizontal line.

In the foregoing, a preferable mode is one wherein the step (c) includes a step of detecting a second vanishing point on the horizontal line based on a characteristic that, at least, in a region being adjacent to the lowest region out of regions other than the lowest region in the road image, intercepts at lowest ends of left and right second straight lines by which left and right white lines in the region being adjacent to the lowest region are approximated, exist on the left and right first straight lines and that the second vanishing point being the intersection of the left and right second straight lines exists on the horizontal line.

Also, a preferable mode is one wherein the step (c) includes a step of predicting an intersection of straight lines by which left and right white lines are approximated, in an upper region other than the lowest region in the road image and not being adjacent to the lowest region, based on an amount of displacement, on the horizontal line, between intersections of straight lines by which left and right white lines in two or more regions below the upper region are approximated. A reason that the above method is possible is as follows. That is, if the image region is divided into more regions, in higher regions, the road image is affected more by noise. In a road such as a highway, a ratio of curvature of a curve is relatively large and the ratio of the curvature does not change at some midpoint of the curve. Therefore, in such the road, there appears only one curve in the road image and its ratio of the curvature is approximately constant.

Also, a preferable mode is one that wherein includes a step of extracting a sequence of points existing on left and right white line image, from the road image, together with a white line filter value showing similarity to the white line featuring points as a sequence of white line featuring points, and wherein the step (a) includes a step of detecting straight lines by which the sequence of white line featuring points is approximated using the least squares method, with weight assigned to the white line filter value, as line approximation for left and right sides and wherein the step (c) includes a step of detecting an intersection, on the horizontal line, of left and right second straight lines by which the sequence of white line featuring points in the region being adjacent to the lowest region is approximated by using the least squares method, for both left and right sides, with the white line filter value assigned and using upper end points of the left and right first straight lines in the lowest region as intercepts at their lowest ends in the region being adjacent to the lowest region.

According to a third aspect of the present invention, there is provided a storage medium storing a program for detecting a road white line, which is a machine-readable storage medium, to process a road image, to detect a white line in the road image and to cause a computer to carry out the following steps:

(a) detecting left and right first straight lines by which left and right white lines are approximated, in a lowest region out of, at least, two regions positioned up and down obtained by dividing the road image;

(b) calculating a horizontal line from a first vanishing point being an intersection of the left and right first straight lines; and (c) detecting straight lines by which left and right white lines are approximated, in regions other than the lowest region, by detecting an intersection based on a characteristic that the intersection of left and right straight lines by which left and right white lines are approximated in the region other than the lowest region in the road image, exists on the horizontal line.

In the foregoing, it is preferable that the step (c) includes a step of detecting a second vanishing point on the horizontal line based on a characteristic that, at least, in a region being adjacent to the lowest region out of regions other than the lowest region in the road image, intercepts at lowest ends of left and right second straight lines by which left and right white lines in the region being adjacent to the lowest region are approximated, exist on the left and right first straight lines and that the second vanishing point being an intersection of the left and right second straight lines exists on the horizontal line.

Also, it is preferable that the step (c) includes a step of predicting an intersection of straight lines by which left and right white lines are approximated, in an upper region other than the lowest region in the road image and not being adjacent to the lowest region, based on an amount of displacement, on the horizontal line, between intersections of straight lines by which left and right white lines in two or more regions below the upper regions are approximated.

Furthermore, it is also preferable that the program includes a program to cause the computer to carry out a step of extracting, from the road image, a sequence of points existing on left and right white lines as a sequence of white line featuring points, together with a white line filter value showing similarity to the white line featuring points and wherein the step (a) includes a process of detecting straight lines by which the sequence of white line featuring points is approximated using the least squares method, with weight assigned to the white line filter value, for left and right sides, as line approximation of white lines and wherein the step (c) includes a process of detecting an intersection, on the horizontal line, of left and right second straight lines by which the sequence of white line featuring points in the region being adjacent to the lowest region is approximated using the least squares method, for both left and right sides, with weight assigned to the white line filter value and using upper end points, in the lowest region, of the left and right first straight lines as intercepts at lowest ends in the region being adjacent to the lowest region.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
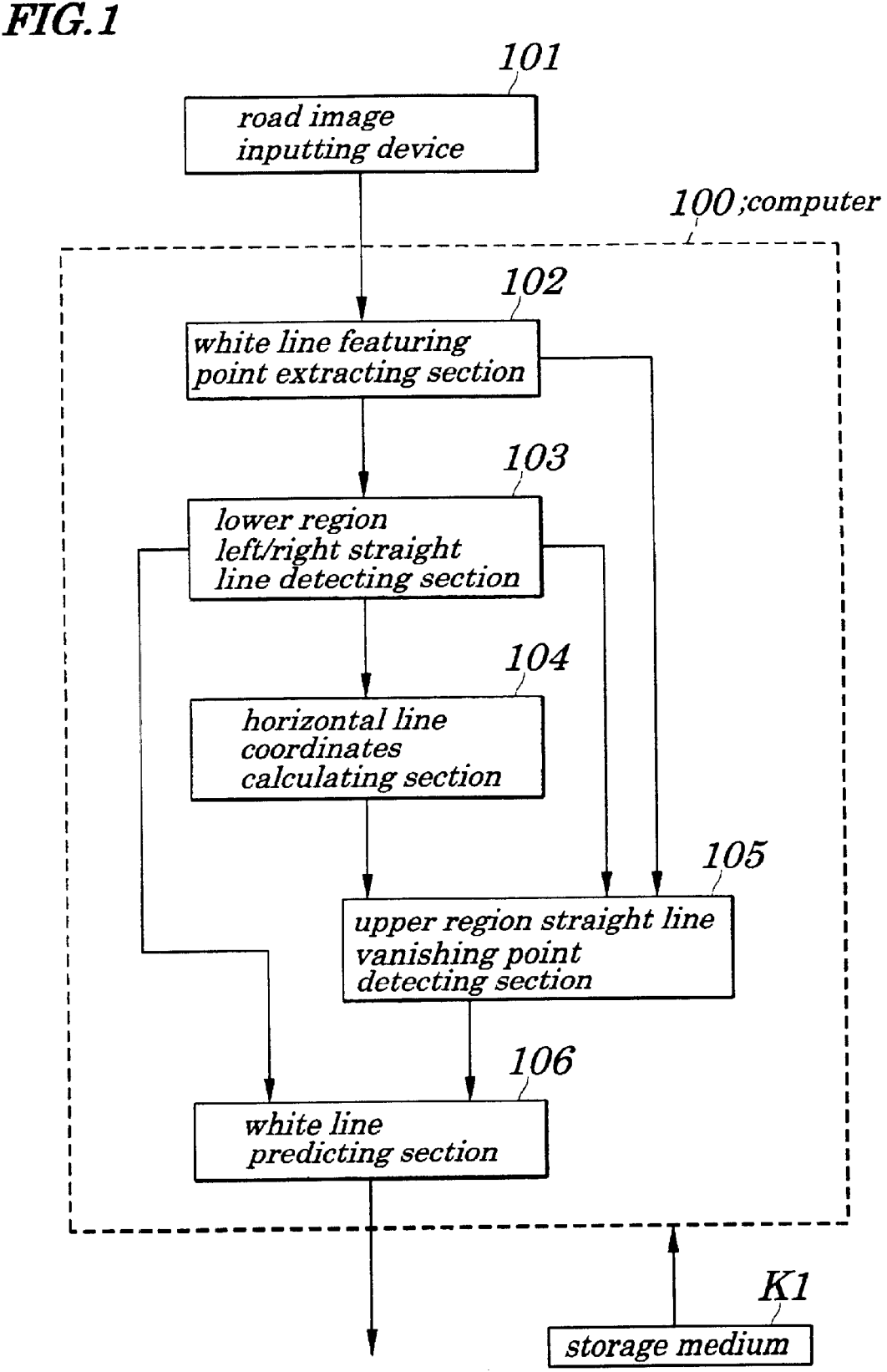
FIG. 1 is a block diagram showing configurations of a system according to a first embodiment of the present invention.

FIG. 1 is a block diagram showing configurations of a system according to a first embodiment of the present invention. As shown in FIG. 1, the system is composed of a computer 100 and a road image inputting device 101 connected to the computer 100.

The road image inputting device 101 is a device to produce road information including white lines at both sides of a travelling lane on a road surface to be detected, which is obtained through an image pickup of the road surface ahead of a vehicle. The road image inputting device 101 is attached to a front portion of the vehicle in a manner so as to be horizontal. In the first embodiment, the road surface to be detected is one which can be approximated by a plane, within an image range obtained by the image pickup, such as a highway having little change in its slope.

The computer 100 has a processing device such as an MPU (microprocessor unit) and a memory such as a main memory and is adapted to operate under a control of a program. A storage medium K1 connected to the computer 100 is a machine-readable memory medium including a CD-ROM (Compact Disk-Read Only Memory), magnetic disk, semiconductor memory or a like, which stores the program for detecting road white lines. The program for detecting road white lines stored in the storage medium K1 is read by the computer 100 when the computer 100 is booted or at any other time required and, through control operations of the computer 100, a white line featuring point extracting section 102, lower region left/right straight line detecting section 103, horizontal line coordinates calculating section 104, upper region straight line vanishing point detecting section 105 and white line predicting section 106 are implemented on the computer 100.

Figure 2:
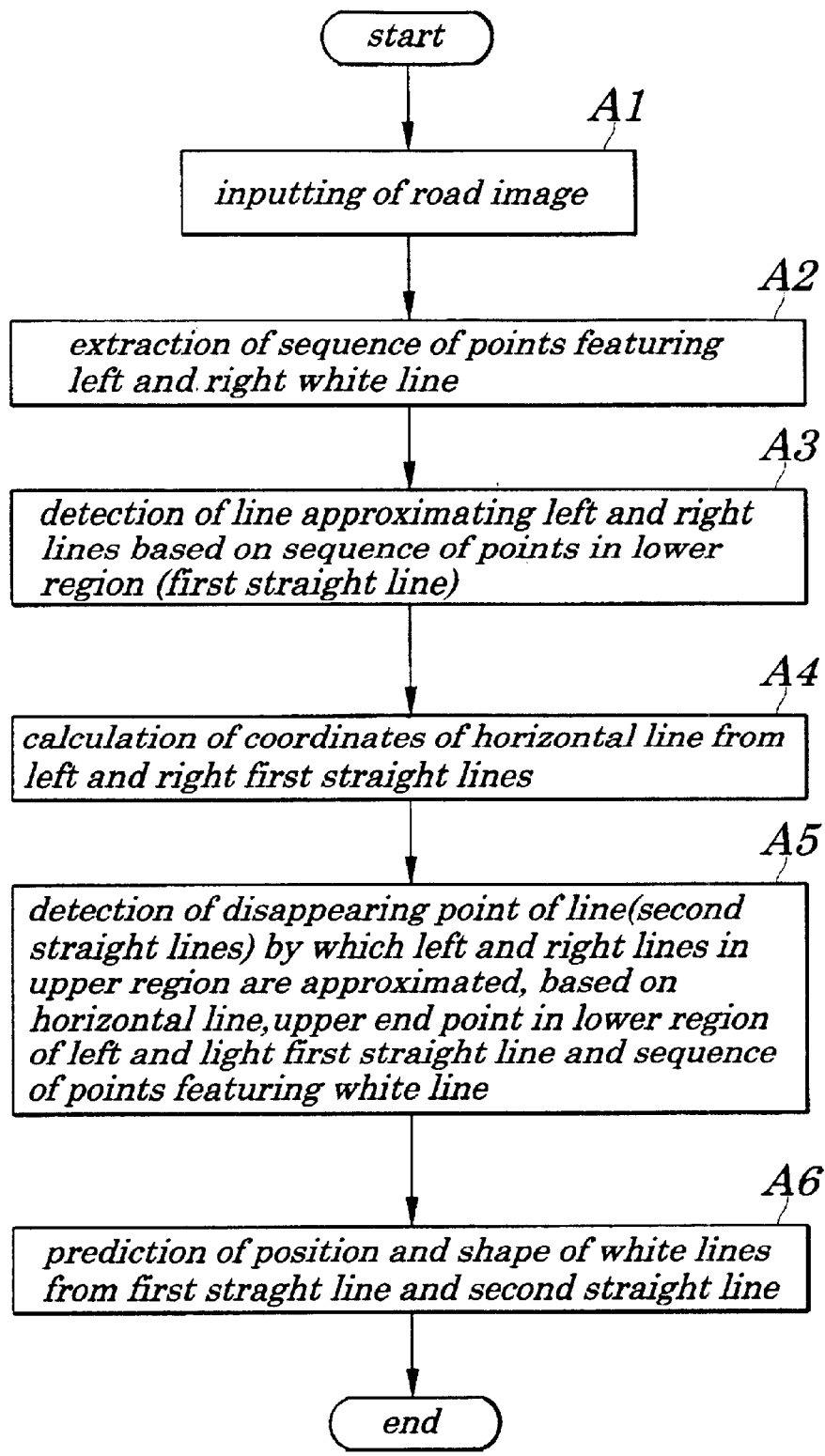
FIG. 2 is a flowchart showing operations of the system according to the first embodiment of the present invention.

First, operations of these sections will be hereinafter described referring to FIGS. 1 to 3.

The white line featuring point extracting section 102 extracts a sequence of points existing on images of left and right white lines 305 and 304 from a road image 301 obtained through the road image inputting device 101 as a sequence of points featuring the white line.

The lower region left/right straight line detecting section 103, in a lower region 302 being one of regions positioned up and down, obtained in advance, by dividing the road image 301, detects a line by which the sequence of white line featuring points extracted by the white line featuring point extracting section 102 is best approximated, for the left and right white lines 305 and 304. A left first straight line 307 is a straight line detected for the left white line 305, while a right first straight line 306 being a straight line detected for the right white line 304. The road image 301 maybe divided into two regions, the lower region 302 and an upper region 303 at an arbitrary place. For example, the road image 301 is divided so that a border line between the lower region 302 and upper region 303 is positioned at a specified distance (for example, 30 m) in front of the vehicle.

Figure 3:
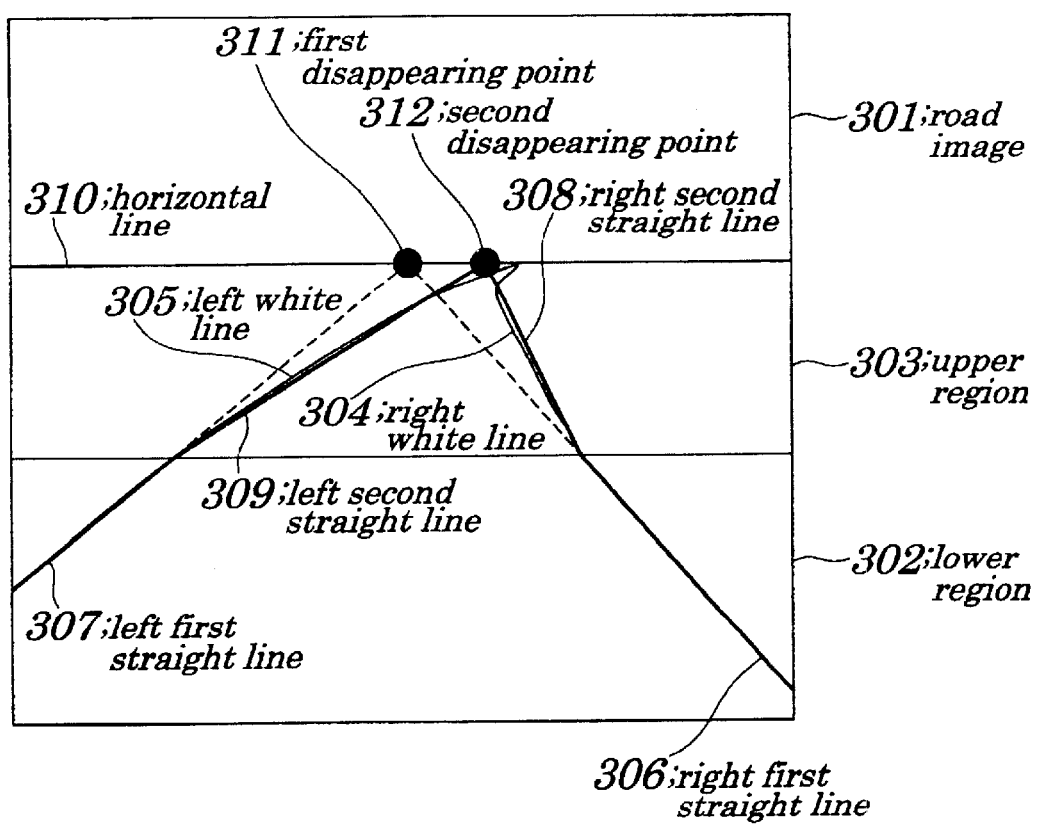
FIG. 3 is a diagram of a road image explaining operations of the system according to the first embodiment of the present invention.

The horizontal line coordinates calculating section 104, based on a characteristic that, when the road surface is planar in a real world situation, an intersection, in the road image 301, of parallel lines on the road surface exists on a horizontal line 310, as shown in FIG. 3, calculates to obtain a first vanishing point 311 being an intersection of the left first straight line 307 and the right first straight line 306, in the lower region 302 detected by the white line featuring point extracting section 102, detects a horizontal line passing through the first vanishing point 311 as the horizontal line 310 and finally calculates coordinates of the horizontal line 310.

The upper region straight line vanishing point detecting section 105 detects a left second straight line 309 and a right second straight line 308 by which left and right white lines are approximated, based on the horizontal line 310 detected by the horizontal line coordinates calculating section 104, based on the left first straight line 307 and right first straight line 306 detected by the lower region left/right straight line detecting section 103 and based on the sequence of white line featuring points in the upper region 303 extracted by the white line featuring point extracting section 102. That is, as shown in FIG. 3, based on a characteristic that, if the road surface is planar in the real world situation, the intersection, on the road image 301, of parallel lines on the road surface exists on the horizontal line, by assuming that the intersection (second vanishing point 312) on the road image 301 of the left second straight line 309 by which the left white line 305 in the upper region 303 is approximated and the right second straight line 308 by which the right white line 304 in the upper region 303 is approximated, exists on the horizontal line 310 and that an intercept of the left second straight line 309 in the upper region 303 exists on the left straight line 307 in the lower region 302 and the intercept of the right second straight line 308 in the upper region 303 exists on the right first straight lines 306 in the lower region 302, a second vanishing point 312 is detected and a line connecting the detected second vanishing point 312 with an intercept of an upper end of the left first straight line 307 in the lower region 302 is used as the left second straight line 309 and a line connecting the second vanishing point 312 with an intercept of an upper end of the right first straight line 306 in the lower region 302 is used as the right second straight line 308.

The white line predicting section 106, based on approximate lines, left first straight line 307 and right first straight line 306 detected in the lower region 302 and approximate lines, left second straight line 309 and right second straight line 308 detected in the upper region 303, predicts positions and shapes of the left white line 305 and right white line 304 and outputs their values.

Next, operations of a whole system of the first embodiment will be described below by referring to FIGS. 1 to 3.

First, a road image 301 is input into a road image inputting device 101 (Step A1). Next, the sequence of points featuring the left and right white line is extracted from the road image 301 by the white line featuring point extracting section 102 (Step A2). In the lower region 302 out of regions positioned up and down obtained by dividing, in advance, the road image 301, the left first straight line 307 and right first straight line 306 by which the sequence of points featuring white lines is approximated by the lower region left/right straight line detecting section 103 (Step A3). Then, the horizontal line passing through the intersection (first vanishing point 311) of the left first straight line 307 and right first straight line 306 is calculated by the horizontal line coordinates calculating section 104 to obtain the horizontal line 310 (Step A4). Next, based on a characteristic that intercepts at the lower end of the upper region of the left second straight line 309 and right second straight line 308 by which the sequence of points featuring the left white line 305 and right white line 304 is approximated, exist on the left first straight line 307 and right first straight line 306 respectively and that the left and right intersections (second vanishing point 312) exist on the horizontal line 310, position of a second vanishing point 312 is detected on the horizontal line 310, on a basis of which the left second straight line 309 and right second straight line 308 are detected by the upper region straight line vanishing point detecting section 105 in the upper region 303 (Step A5). Finally, positions and shapes of the left white line 305, and right white line 304 are predicted by the white line predicting section 106 based on the left first straight line 307 and right first straight line 306 and the left second straight line 309 and right second straight line 308 their values are output (Step A6).

Next, effects of the system of the first embodiment will be described below.

In the first embodiment, since line approximation of the left white line 305 and right white line 304 in the upper region 303 can be made only by detection of the vanishing point on the horizontal line 310, that is, by calculation of only one parameter, line approximation being effective and resistant to noise is made possible.

Moreover, according to the first embodiment, since the line approximation of the left white line 305 and right white line 304 in the upper region 303 is made at a same time using one parameter, even if either of the left white line 305 and right white line 304 cannot be detected due to an obstruction or a like in the upper region 303, the line approximation of both left white line 305 and right white line 304 can be made using either of the white lines which can be detected.

Moreover, according to the embodiment, since the system is so configured that a result of approximation in the lower region 302 is incorporated, in a form of lower end intercepts, into line approximation of the white lines in the upper region 303, the line approximation being contradictory between in the lower region and in the upper region can be prevented and therefore an after-treatment of conformity judgement on the line approximation in both regions is not required.

Figure 4:
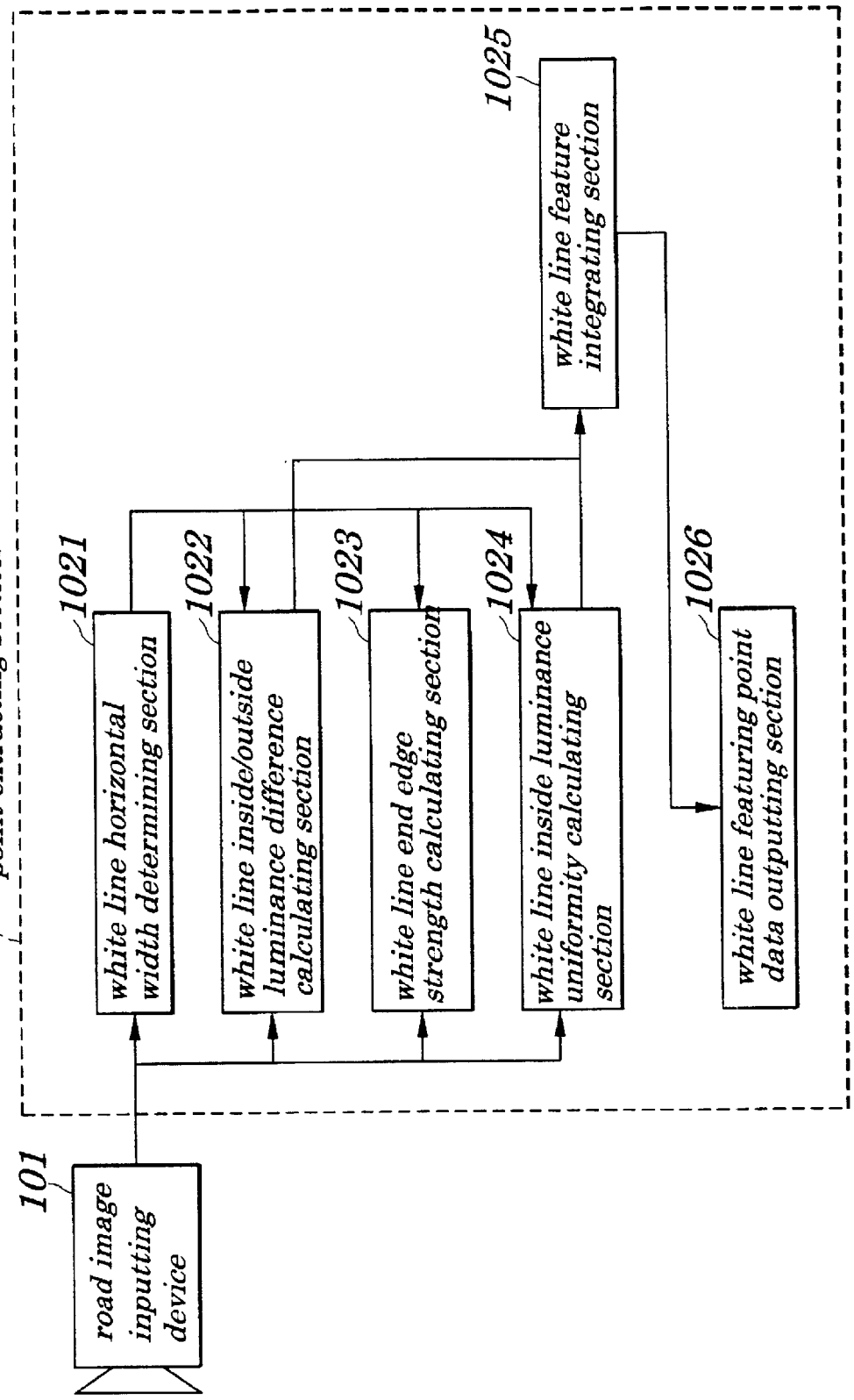
FIG. 4 is a block diagram of a white line featuring point extracting section of the system according to the first embodiment of the present invention.
Figure 5:
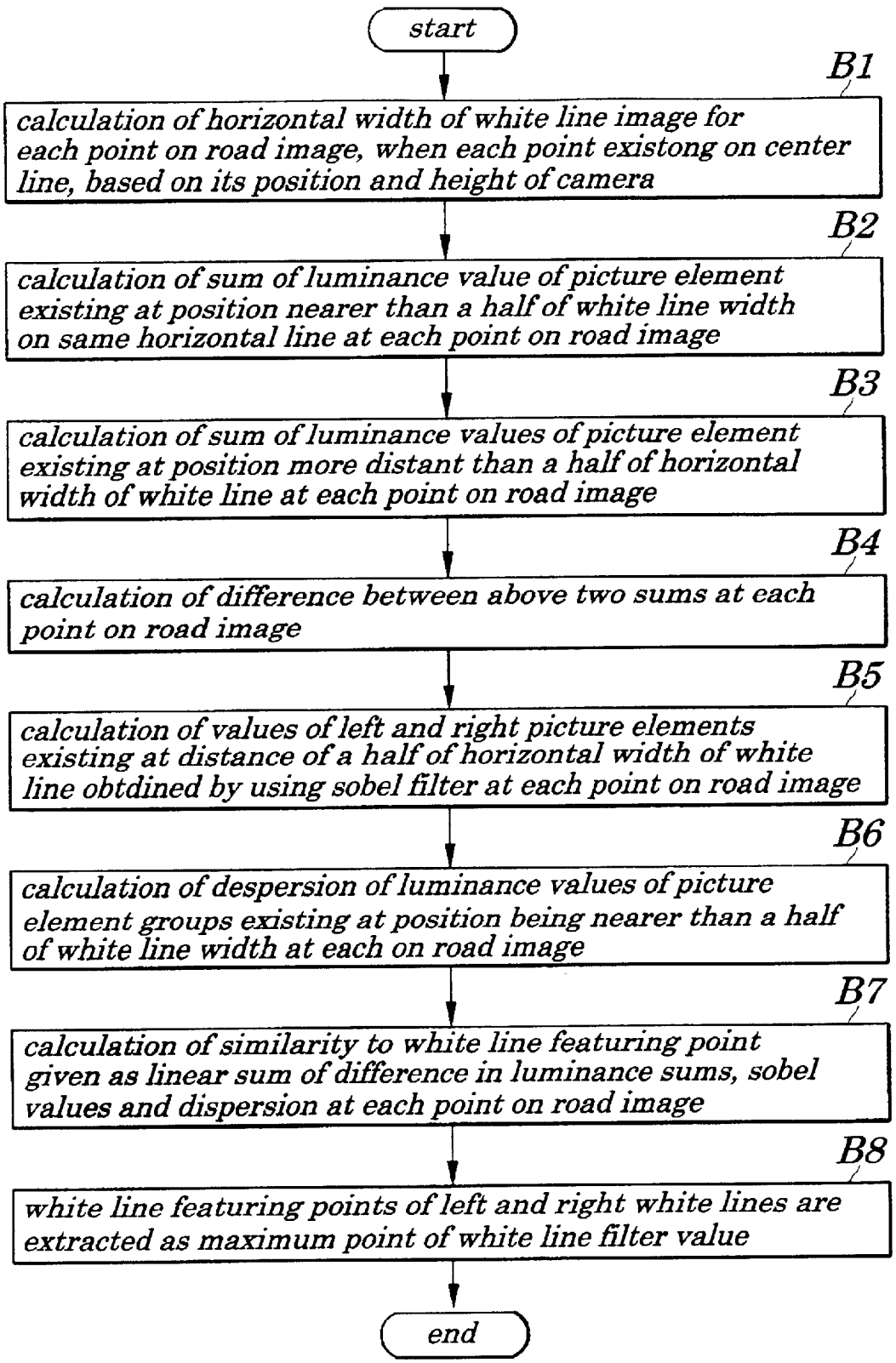
FIG. 5 is a flowchart explaining operations of the white line featuring point extracting section of the system according to the first embodiment of the present invention.

Next, operations of the system of the embodiment will be described in more detail by referring to concrete examples. FIG. 4 is a block diagram of the white line featuring point extracting section 102 of the system according to the first embodiment. FIG. 5 is a flowchart explaining operations of the white line featuring point extracting section 102 of the system according to the first embodiment. The white line featuring point extracting section 102 performs arithmetic computations on featuring values including a difference in a sum of luminance values inside and outside of the white line image, a strength of an edge at an end of the white line image, a uniformity in the luminance values inside of the white line image or a like at each point on the road image, calculates similarity to the white line featuring point at each point on the road image in the form of a linear sum of each calculated featuring value and extracts the white line featuring point based on the calculated similarity to the white line featuring point at each point on the road image. A white line featuring point extracting,section 102 includes a white line horizontal width determining section 1021, a white line inside/outside luminance difference calculating section 1022, a white line end edge strength calculating section 1023, a white line inside luminance uniformity calculating section 1024, a white line feature integrating section 1025 and a white line featuring point data outputting section 1026.

Operations of the white line featuring point extracting section 102 of the embodiment will be described below.

Figure 6:
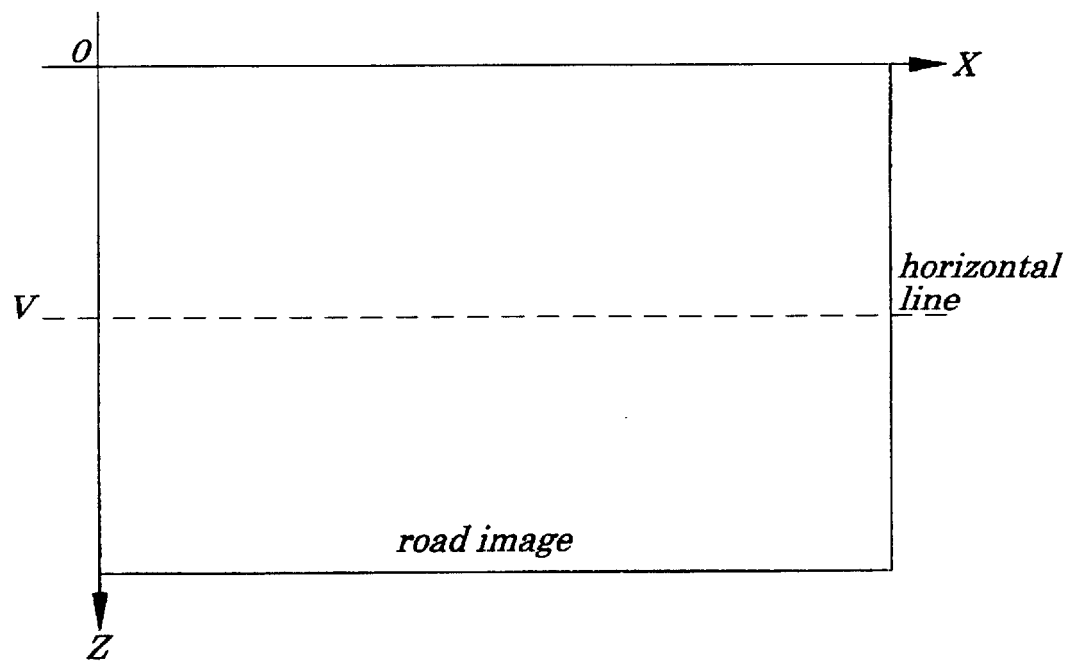
FIG. 6 is a diagram showing a coordinate system of a road image inputting device according to the first embodiment of the present invention.

First, by using the white line horizontal width determining section 1021, at each point on the road image, a horizontal width B of a white line image, when each point on the road image exists on a center line, is calculated based on its position and a height of the road image inputting device 101 in accordance with a formula "B=ΔX (z−V)/H" (where "ΔX" represents a white line width in a real space and "H" represents a height of the road image inputting device 101 relative to a standard face, that is, road surface, all of which are predetermined fixed values and "V" represents a value on a Z axis of coordinates of the horizontal line and, in an initial state, the predetermined value is employed and, after the horizontal line is detected by the horizontal line coordinates calculating section 104, the detected values are employed.) (Step B1). A coordinate system of the road image inputting device 101 is shown in FIG. 6. In the calculation, the white line horizontal width determining section 1021, to determine a width of a white line at each point on the road image, uses a characteristic that a horizontal width of the white line reaches a more actual white line width if the white line exists on this side nearer to the vehicle and, as the white line becomes far from the vehicle, its horizontal width becomes narrower and when the white line is in the neighboring area of the horizontal line (that is, z=V), its width becomes zero.

Next, a sum of luminance values of a picture element existing in a position being nearer than a half of the horizontal width of the white line, out of picture elements existing on a same horizontal line is calculated at each point on the road image by the white line inside/outside luminance difference calculating section 1022 (Step B2). Similarly, a sum of luminance values of a picture element in a position being more distant than a half of the horizontal width of the white line and being nearer than the horizontal width, out of the picture elements existing on the same horizontal line is calculated (Step B3) at each point on the road image. Then, a "difference" between the sum of the luminance values of the picture element existing in a position being nearer than half of the horizontal width of the white line and the sum of luminance values of the picture element in a position being more distant than half of the horizontal width of the white line is calculated (Step B4). At this point, a number of the picture elements existing in the position being nearer than half of the horizontal width of the white line is made equal to the number of the picture elements existing in the position being more distant than half of the horizontal width of the white line. If a point on the road image is positioned at a center of the white line image, since, at Step B2, the sum of luminance values of the picture element within the white line image is calculated and, at Step B3, the sum of luminance values of the picture element existing outside of the portion contacting the white line image, the difference between them shows a maximum value. This "difference" tends to become smaller as the point on the road image deviates far from the center of the white line image.

Next, by using the white line end edge strength calculating section 1023, at each point on the road image, an edge strength in left and right two picture elements existing at a distance being a half of the horizontal width of the white line on a same horizontal line is calculated as a value of a picture element obtained by using, for example, a Sobel filter on an original road image (Step B5). If the point on the road image is positioned within the white line image, the edge strength tends to become larger.

Moreover, by using the white line inside luminance uniformity calculating section 1024, at each point on the road image, the uniformity of the luminance values including dispersion of luminance values within picture element groups, a difference between a maximum luminance value and a minimum luminance value or a like, of left and right picture element groups existing in the position being nearer than a half of the horizontal width of the white line on the same horizontal line is calculated (Step B6). When the point on the road image is positioned at the center of the white line image, the uniformity becomes most excellent, and it becomes degraded little by little as the point in the road image deviates far from the center of the white line image.

Next, by using the white line feature integrating section 1025, at each point on the road image, similarity to the white line featuring point given in the form of a linear sum, for example, of the difference in the sum of inside/outside luminance values, edge strength and uniformity of luminance is calculated (Step B7). A filter in which the similarity to the white line featuring point is associated with at each point on the road image is determined as a white line filter and the similarity to the white line featuring point of each road image point is determined as a white line filter value.

Finally, by using the white line featuring point data outputting section 1026, one left road image point and one right road image point, at which the white line filter value is a maximum value, are extracted as the white line featuring point of the left and right white lines on each horizontal line and outputted (Step B8). Outputted data of the white line featuring point contains coordinates of the road image point and the white line filter value of the road image point.

Figure 7:
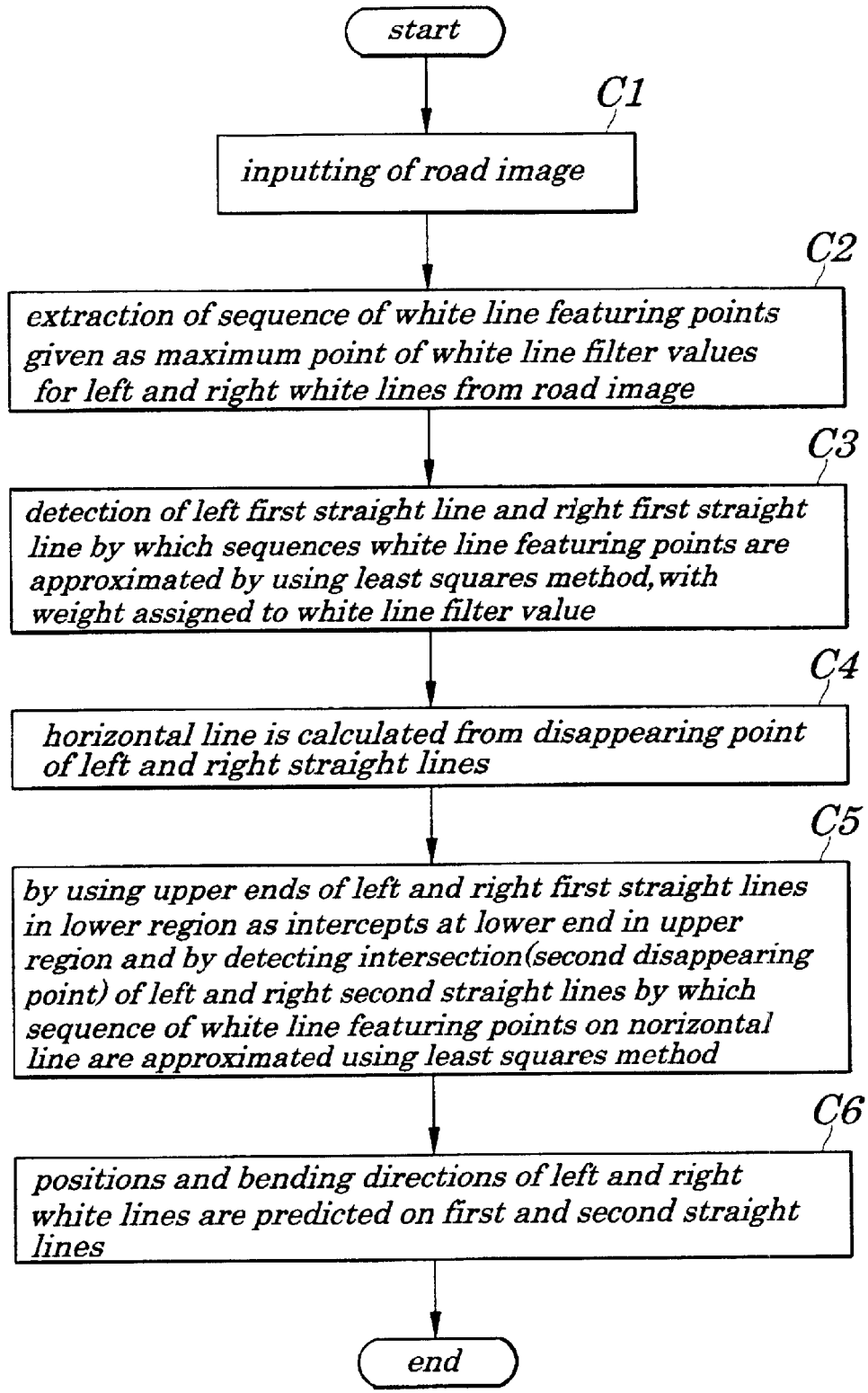
FIG. 7 is a flowchart explaining procedures for operations of the white line featuring point extracting section of the system according to the first embodiment of the present invention.

Operations of the system of the embodiment by referring to FIG. 7 are described below. FIG. 7 is a flowchart explaining procedures for operations of the white line featuring point extracting section 102.

First, a road image is input by using the road image inputting device 101 (Step C1). Next, by using the white line featuring point extracting section 102, the white line filter of the road image is created in a manner described above and the sequence of the white line featuring points given as the maximum point of the white line filter value for the left and right white line is extracted (Step C2). Sequences of the left and right white line featuring points are expressed as below.

Sequence of left white line featuring points:

(xli, zli)≡Xli, i=0, 1, . . .

Sequence of right white line featuring points:

(xri, zri)≡Xri, i=0, 1, . . .

where, Xli and Xri are vectors. The white line filter value at a point (x, z) on the road image is W (x, z).

Figure 8:
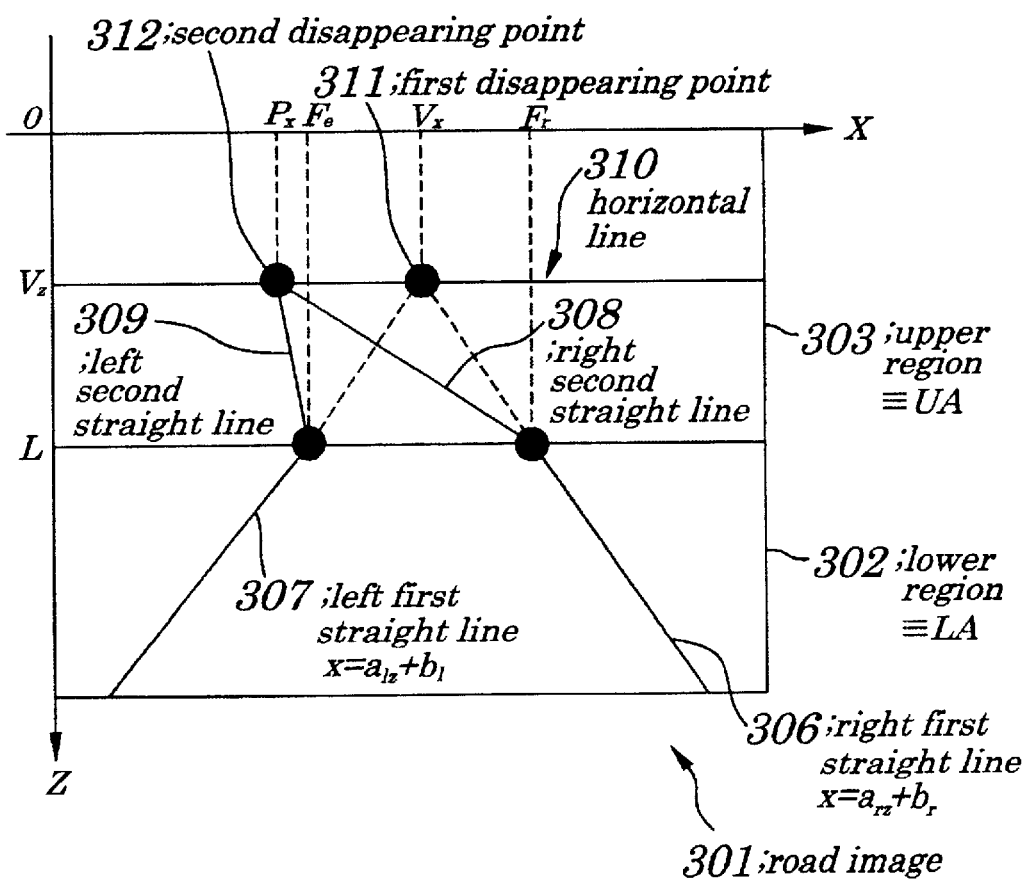
FIG. 8 is a diagram explaining operations of a lower region left/right straight lines detecting section, horizontal line coordinates calculating section and upper region straight line vanishing point detecting section of the system according to the first embodiment of the present invention.

Next, as shown in FIG. 8, in a lower region LA, which is one of the regions positioned up and down, obtained by dividing, in advance, the road image, by using the lower region left/right straight lines detecting section 103, a left first straight line and a right first straight line by which the sequence of the white line featuring points is approximated by using the least squares method, with weight assigned to the white line filter value, are detected independently on the left and right sides (Step C3). That is, the left first straight line given by a formula "$x=a_{L}z+b_1$" is set so that a result from calculation of the following formula is minimum:

$$f(a_l, b_l) \equiv \sum_{x_{li} \in LA} w(x_{li}, z_{li})\{x_{li} - (a_l z_{li} + b_l)\}^2 \quad \text{[Formula 1]}$$

Similarly, the right straight line given by a formula "x=$a_{rz}$+$b_r$," is set so that a result from calculation of the following formula is minimum:

$$f(a_r, b_r) \equiv \sum_{x_{ri} \in LA} w(x_{ri}, z_{ri})\{x_{ri} - (a_r z_{ri} + b_r)\}^2 \quad \text{[Formula 2]}$$

Next, by using the horizontal line coordinates calculating section 104, a horizontal line passing an intersection (first vanishing point) of the left and right straight lines is calculated (Step C4). In FIG. 8, coordinates of the first vanishing point is (Vx, Vz) and coordinates of the horizontal line is (z=Vz).

Then, by using the upper region straight line vanishing point detecting section, in the upper region UA, by using upper ends of the left and right first straight lines in the lower region LA as intercepts at lower ends in the upper region UA, and by detecting an intersection (second vanishing point) of left and right second straight lines by which the sequence of the white line featuring points on the horizontal line are approximated using the least squares method (Step C5), the left and right straight lines are detected. That is, if upper end points of the left and right first straight lines in the lower region are (Fe, L) and (Fr, L) respectively, and when the left second straight line is given by a formula "x=$\{(F_l-P_x)/(L-V_z)\}(z-L)+F_l$," and when the right second straight line is given by a formula "x=$\{(F_r-P_x)/(L-V_z)\}(z-L)+F_r$,", $P_x$ is obtained so that a result from the following formula becomes minimum:

$$g(P_x) \equiv \sum_{x_{li} \in UA} w(x_{li}, z_{li})\left\{x_{li} - \left(\frac{F_l - P_x}{L - V_z}(z_{li} - L) + F_l\right)\right\}^2 + \quad \text{[Formula 3]}$$

$$\sum_{x_{ri} \in UA} w(x_{ri}, z_{ri})\left\{x_{ri} - \left(\frac{F_r - P_x}{L - V_z}(z_{ri} - L) + F_r\right)\right\}^2$$

Finally, by using the white line predicting section 106, positions and bending directions of the left and right white lines are predicted based on the first and second straight lines and their values are outputted (Step C6). Information other than the positions and bending directions, for example, a radius of curvature of each of the left and right white lines may be predicted.

Second Embodiment

Figure 9:
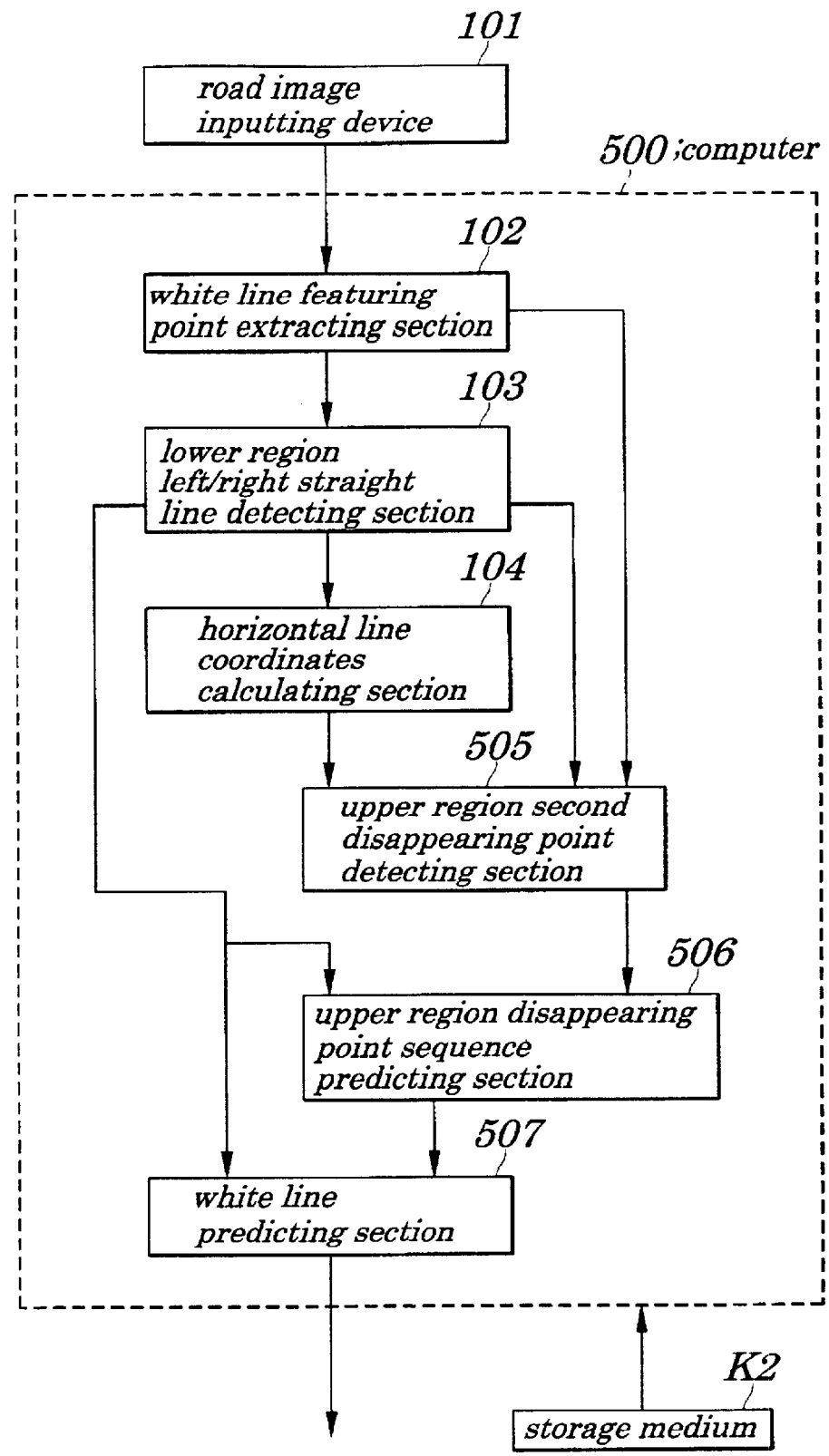
FIG. 9 is a block diagram showing configurations of a system according to a second embodiment of the present invention.

FIG. 9 is a block diagram showing configurations of a system according to a second embodiment of the present invention. As shown in FIG. 9, the system of the second embodiment includes a computer 500 and a road image inputting device 101 connected to the computer 500.

The road image inputting device 101 is adapted to obtain image information including white lines on both sides of a travelling lane on a road surface to be detected, through an image pickup of the road in front of a vehicle and is horizontally mounted in a front portion of the vehicle. According to the second embodiment, the road surface to be detected is one which has only one curve and can be approximated by a plane, within an image range obtained by the image pickup, such as a highway having little change in a slope and no change in a curvature at some midpoint of the curve of the highway.

The computer 500 contains processing devices such as an MPU and a memory including a main memory or a like, which is operated by program control. A storage medium K2 connected to the computer 500 is a machine-readable storage medium such as a CD-ROM, magnetic disk, semiconductor memory or a like, in which a program for detecting white lines of the road surface is stored. The program for detecting road white lines detected in the storage medium K2 is read by the computer 500 when being booted or at other times required and, through control operations of the computer 500, a white line featuring point extracting section 102, lower region left/right straight line detecting section 103, horizontal line coordinates calculating section 104, upper region second vanishing point detecting section 505, upper region vanishing point sequence predicting section 506 and white line predicting section 507 are implemented on the computer 500.

The white line featuring point extracting section 102 extracts a sequence of points, as a white line featuring point sequence, existing on left white line 305 and right white line 304 images from a road image 301 obtained by the road image inputting device 101.

The lower region left/right straight line detecting section 103, in a lower region 302 out of regions positioned up and down, obtained by dividing, in advance, the road image 301, detects straight lines for left white line 305 and right while line 304 by which sequences of the left and right white line featuring points extracted by the white line featuring point extracting section 102 is best approximated. The straight line for the left white line 305 is a left first straight line 307 and the straight line for the right white line 304 is a right first straight line 306. Moreover, the road image 301 may be bifurcated into two regions including the lower region 302 and other regions in any position, for example, it can be bifurcated so that the border on an upper side in the lower region 302 is positioned at a specified distance (for example, 30 m) in front of the vehicle.

The horizontal line coordinates calculating section 104, by using a characteristic that, if the road surface is planar in the real world, an intersection, in the road image, of parallel lines on the road surface exists on a horizontal line, as shown in FIG. 3, calculates to obtain a first vanishing point 311 being an intersection between the left first straight line 307 and the right first straight line 306 in the lower region 302 detected by the white line featuring point extracting section 102, detects a horizontal line passing through the first vanishing point 311 as a horizontal line 310 and calculates coordinates of the horizontal line 310.

Figure 10:
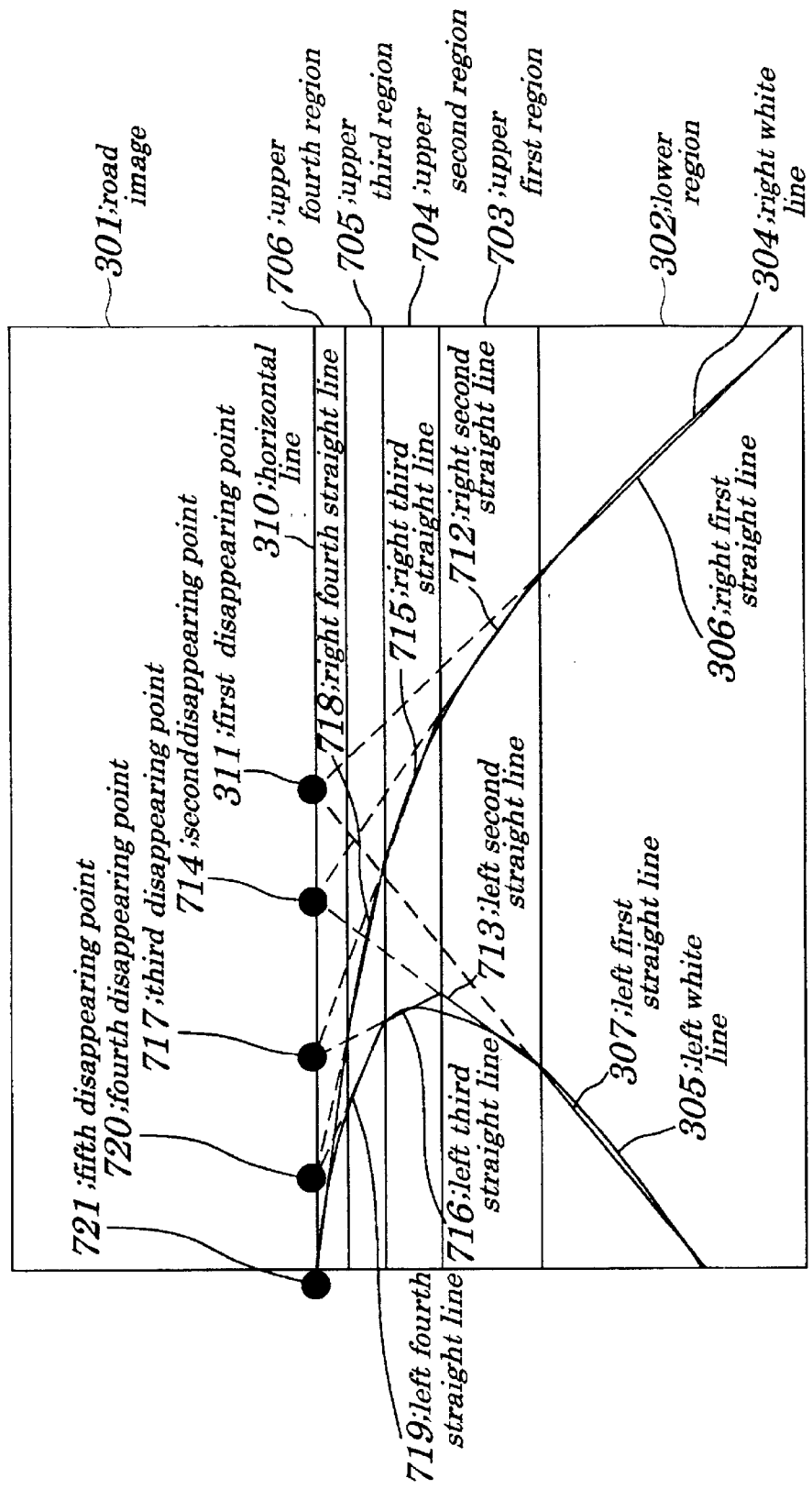
FIG. 10 is a diagram of a road image explaining operations of the system according to the second embodiment of the present invention.

The upper region second vanishing point detecting section 505, in an upper first region 703 existing in a lowest position out of two or more upper regions 703 to 706 obtained by dividing the upper region as shown in FIG. 10, detects an intersection (second vanishing point 714) of straight lines (left second straight line 713 and right second straight line 712) by which the sequence of the left and right white line featuring points in the upper first region 703 is approximated, based on the horizontal line 310 detected by the horizontal line coordinates calculating section 104, on left first straight line 307 and right first straight line 306 detected by the lower region left/right straight lines detecting section 103 and on sequences of the white line featuring points in the upper first region 703 extracted by the white line featuring point extracting section 102, and the left and right second straight line 713 and right second straight line 712 are detected, based on the second vanishing point 714. That is, as shown in FIG. 10, based on a characteristic of parallel straight lines on the road surface described above that an intersection (second vanishing point 714) of the left second straight line 713 and right second straight line 712 by which the left white line 305 and the right white line 304 in the upper first region 703 are approximated, exists on the horizontal line 310 and that intercepts of the left second straight line 713 and right second straight line 712 at the lower end in the upper first region 703 exists on the left first straight line 307 and right first straight line 306 in the lower region 302, the second vanishing point 714 is detected, and a straight line connecting the detected second vanishing point 714 with the intercept at an upper end of the left first straight line 307 in the lower region 302 is determined as a left second straight line 713 and a straight line connecting the second vanishing point 714 with the intercept at an upper end of right first straight line 306 in the lower region 302 is determined as a right second straight line 712.

The upper region is divided into two or more regions positioned up and down so that widths of other regions in their up and down directions are in a same length of a road in the real space, at least except regions neighboring the horizontal line 310. That is, as shown in FIG. 10, the upper region is divided so that widths of the upper first region 703, of the upper second region 704 and of the upper third region 705 in their up and down directions are in a same length (for example, 30 m) of the road in real space and a remaining region is assigned to the upper fourth region 706 neighboring the horizontal line 310.

The upper region vanishing point sequence predicting section 506, in each region of the upper second region 704 to upper fourth region 706, predicts an intersection of straight lines, by which the left white line 305 and right white line 304 in two or more regions existing on the lower side of the region are approximated, based on an amount of displacement on the horizontal line 310 between intersections of straight lines in the lower two or more regions, by which the left white line 305 and right white line 304 are approximated, and obtains, based on their intersections, a straight line, by which the left white line 305 and right white line 304 are approximated, in each region. As shown in FIG. 10, a third vanishing point 717 of left third straight line 716 and right third straight line 715 in the upper second region 704, a fourth vanishing point 720 of left fourth straight line 719 and right fourth straight line 718 in the upper third region 705 and a fifth vanishing point 721 of left fifth straight line in the upper fourth region 706 are predicted from the first vanishing point 311 detected by the lower region left/right straight lines detecting section 103 and a second vanishing point 714 detected by the upper region second vanishing point detecting section 505, and straight lines connecting the third vanishing point 717 with intercepts of upper ends of the second straight line 713 and right third straight line 712 in the upper first region 703 are determined as the left third straight line 716 and the right third straight line 715, and straight lines connecting the fourth vanishing point 720 with intercepts of upper ends of the left third straight line 716 and right third straight line 715 in the upper second region 704 are determined as the left fourth straight line 719 and the right fourth straight line 718, and straight lines connecting the fifth vanishing point 721 with intercepts of upper ends of the left fourth straight line 719 and right fourth straight line 718 in the upper third region 705.

The white line predicting section, 507 predicts positions and shapes of the left and right white line 305 and right white line 304 based on the straight line by which the left and right white line 305 and right white line 304 detected in the lower region 302 and upper regions 703 to 706 are approximated and outputs their values.

Next, overall operations of the system according to the second embodiment will be described by referring to FIGS. 9 to 11.

Figure 11:
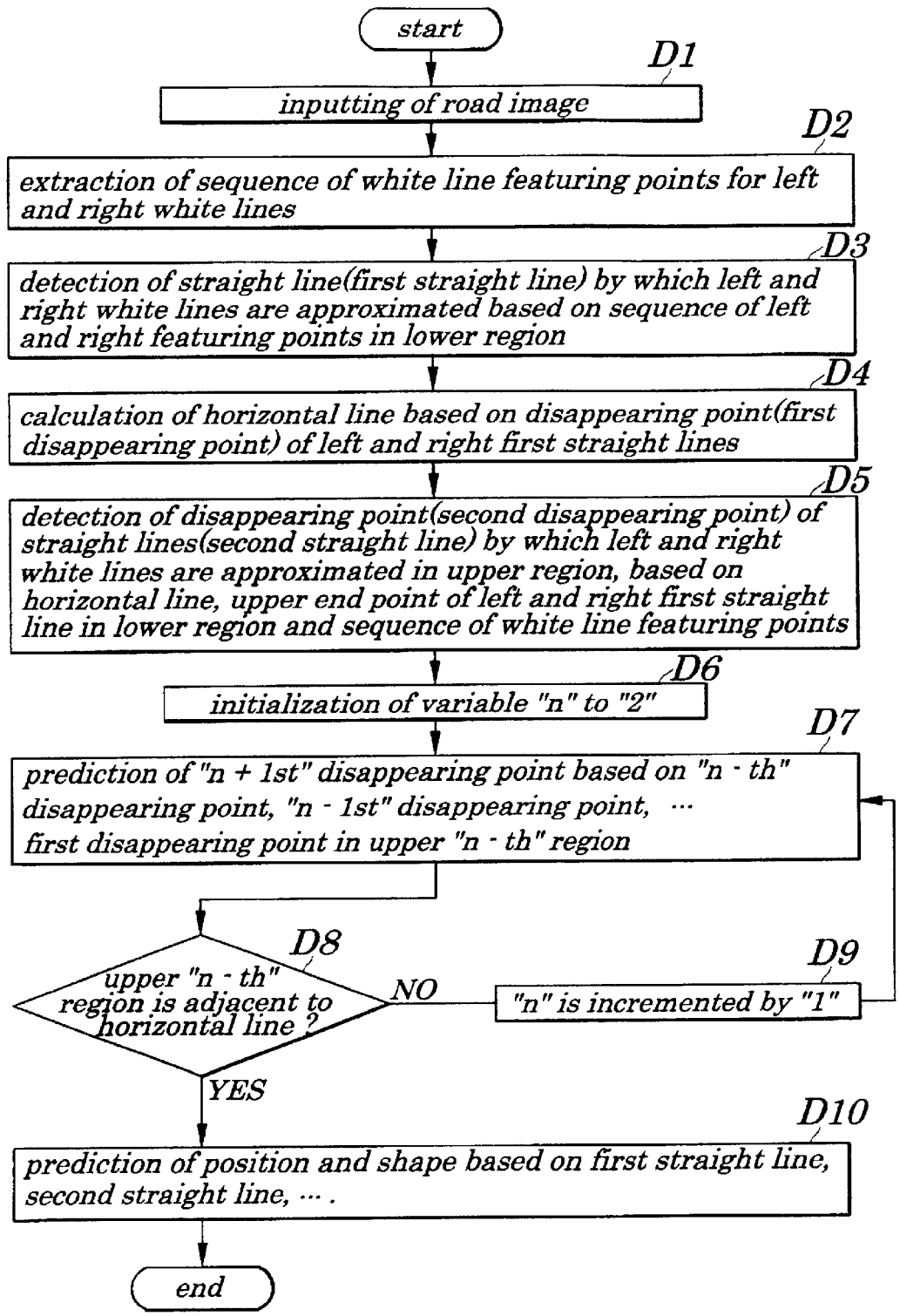
FIG. 11 a flowchart explaining procedures for operations of a white line featuring point extracting section of the system according to the second embodiment of the present invention.

First, the road image 301 is input by the road image inputting device 101 (Step D1 in FIG. 11). Sequences of the white line featuring points for the left and right white lines are extracted from the road image 301 by the white line featuring point extracting section 102 (Step D2). Moreover, left first straight line 307, right first straight line 306 by which the left white line 305 and left white line 304 are approximated based on the sequence of the white line featuring points, are detected, in the lower region 302 out of regions positioned up and down, obtained by dividing, in advance, the road image 301, by the lower region left/right straight lines detecting section 103 (Step D3). Next, a horizontal line passing through the intersection (first vanishing point 311) of the left first straight line 307 and right first straight line 306 is calculated by the horizontal line coordinates calculating section 104 as the horizontal line 310 (Step D4). By using the upper region second vanishing point detecting section 505, in the upper first region 703 placed in the lowest position out of regions obtained by dividing, in advance, the upper region into two or more upper regions 703 to 706 positioned up and down, on the presumption that intercepts of the left and second straight line 713 and right second straight line 712 of lower ends in the upper first region 703 are on the left first straight line 307 and right first straight line 306 and that an intersection (second vanishing point 714) of the left and right straight lines is on the horizontal line 310, a position of the second vanishing point 714 is detected on the horizontal line 310 on a basis of which the left second straight line 713 and right second straight line 712 are detected (Step D5).

Next, the variable "n" is initialized to "2" (Step D6) and by using the upper region vanishing point sequence predicting section 506, first, in the upper n-th (=2) upper second region 704, based on the n-th (=2) second vanishing point 714 and the n-th (=1) first vanishing point 311, it is presumed that the n+1 (=3) third vanishing point 717 is on the horizontal line 310, on a basis of which the left third straight line 716 and right third straight line 715 are detected (Step D7).

Then, whether the upper n-th (=2) upper second region 704 is adjacent to the horizontal line 310 is judged (Step D8) and, if it is not adjacent, "n" is incremented by one (+1) (Step D9) and the operation is returned to the Step D7 and above processing is repeated. In a case of the example shown in FIG. 10, since the upper second region 704 is not adjacent to the horizontal line 310, the operation returns to Step D7 and, in the upper n-the (n=3) upper third region 705, it is presumed based on the n-th (n=3) third vanishing point 717, n–1st (n=2) second vanishing point 714 that the n+1st (n=4) fourth vanishing point 720 exists on the horizontal line 310, on a basis of which the left fourth straight line 719 and right fourth straight line 718 are detected. In FIG. 10, in a same manner as above, the fifth vanishing point 721 is detected. The left and right fifth straight lines can be obtained from the fifth vanishing point 721. When the fifth vanishing point 721 is obtained at the Step D7, since the upper fourth region 706 is adjacent to the horizontal line 310, a result of the judgement at the Step D8 becomes "YES" and the processing by the upper region vanishing point sequence predicting section 506 is terminated.

Finally, by using the white line predicting section 507, the positions and shapes of the left white line 305 and right white line 304 are predicted based on the left first straight line 307 and right first straight line 306, left second straight line 713 and right second straight line 712, . . . , left fifth straight line and right fifth straight line (Step D10).

Effects to be obtained from the second embodiment will be described below.

According to the second embodiment, since the left and right white lines are approximated by a polygonal line including two or more straight lines in the upper region, an accuracy of the approximation can be held in a curved road.

Moreover, according to the second embodiment, since only the sequence of white line featuring points is used in the upper first region placed in the lowest position out of the lower and upper regions and since the prediction in the upper region is made based on results of detection in these two regions, influence of noise which might increase more in the upper region due to insufficient resolution and to images of other vehicles can be reduced in the road image.

Operations of the system according to the second embodiment will be described below.

Figure 12:
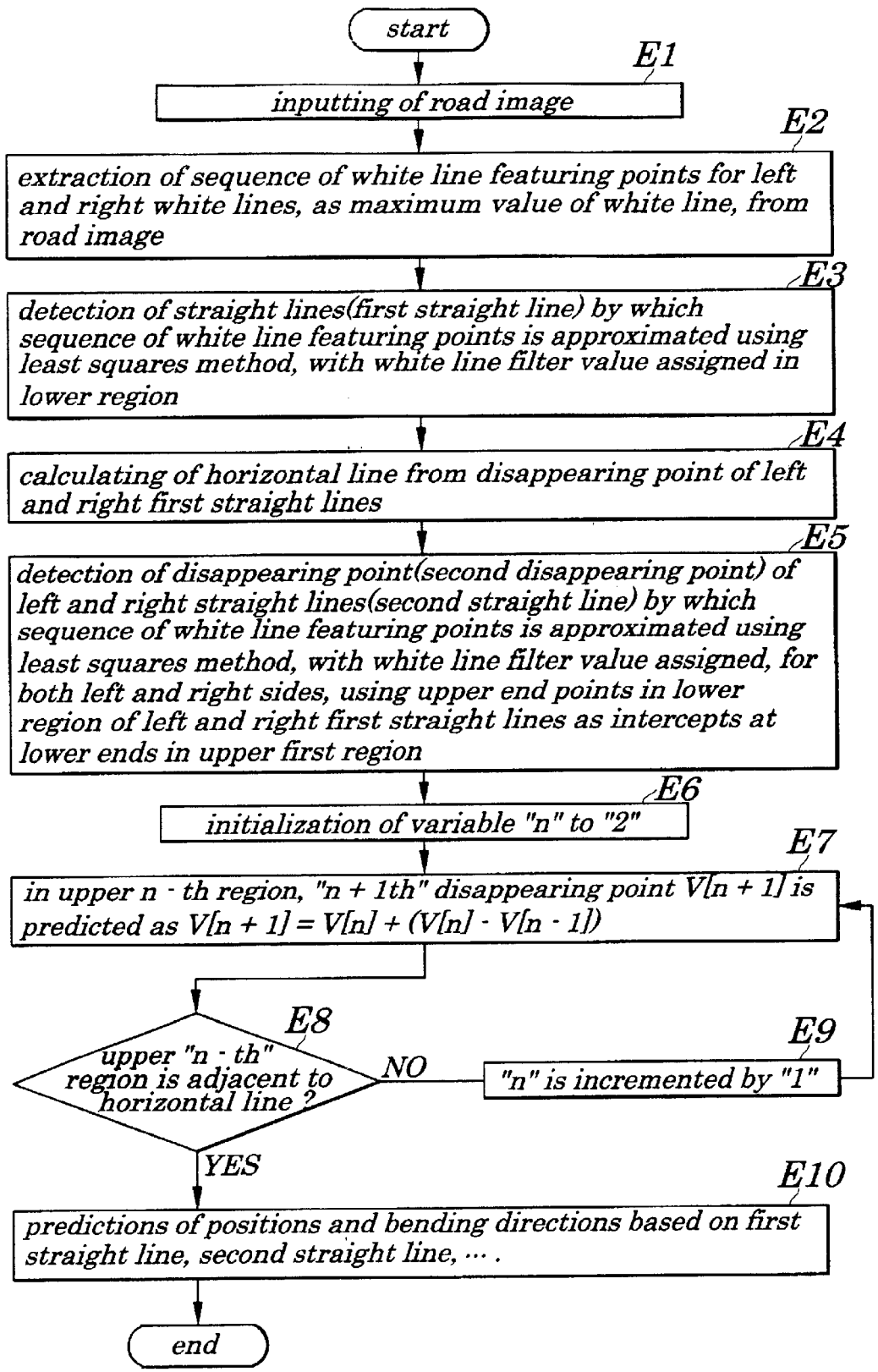
FIG. 12 is a flowchart explaining operations of the system according to the second embodiment of the present invention.

As shown in FIG. 12, a road image is input by the road image inputting section 101 (Step E1). Next, a white line filter is created from the road image by using the white line featuring point extracting section 102 and the sequence of the white line featuring points for left and right white lines is extracted as a maximum value of the white line filter (Step E2). Moreover, by using the lower region left/right straight lines detecting section 103, in the lower region out of regions positioned up and down, obtained by dividing, in advance, the road image, straight lines (first straight line) by which the sequence of the white line featuring points is approximated by using the least squares method, with weight assigned to the white line filter value, are detected on both left and right sides as line approximation of white lines (Step E3). Next, by using the horizontal line coordinates calculating section 104, presuming that the horizontal line passes through an intersection of the left and right straight lines (first vanishing point), the horizontal line is calculated (Step E4).

Next, by using the upper region second vanishing point detecting section 505, in the upper first region placed in the lowest position out of regions positioned up and down, obtained by dividing, in advance, the upper regions into a plurality of regions, the intersection (second vanishing point) of the left and right straight lines, by which the sequence of the white line featuring points is approximated using the least squares method with weight assigned to the white line filter value, for both left and right sides, using an upper end point in the lower region of the left and right first straight lines as intercepts in the upper first regions, is detected on the horizontal line (Step E5).

Next, a variable "n" is initialized to "2" (Step E6). By using the upper region vanishing point sequence predicting section 506, when a position of the n+1st vanishing point in the upper n-th region on the horizontal line is given as V [n+1], the V [n+1] is predicted, based on V[n] and V [n−1], using the following formula:

$$V[n+1] = V[n] + (V[n] - V[n-1])$$

Next, if the upper n-th region is not adjacent to the horizontal line (Step E8), the "n" is incremented by 1 and the operation returns to Step E7 (Step E9). If the upper n-th region is adjacent to the horizontal line, finally, positions and bending directions of the left and right white lines based on the first straight line, second straight line, . . . , are predicted by the white line predicting section 507 and their values are output (Step E10). A radius of curvature may be also predicted and its value may be output.

According to the second embodiment, in the regions other than the regions placed in the lowest position in the road image and regions being adjacent thereto, based on an amount of a displacement among intersections, in the horizontal line, of the straight lines by which the left and right white lines in two or more regions below the regions placed in the lowest position and regions being adjacent thereto are approximated, the intersection of straight lines, by which the left and right white lines in the region are approximated, are predicted. The present invention is not limited to this method. That is, also in the regions other than regions placed in the lowest position in the road image and regions being adjacent thereto, in the same manner as for the regions being adjacent to the regions placed in the lowest position, based on the presumption that intercepts of the lower ends of the left and right straight lines, by which the left and right white lines in the region are approximated, exist on the left and right straight lines in the regions immediately below the region and intersections of the left and right straight lines exist on the same horizontal line, by using the above Formula 3, the intersection may be detected on the horizontal line and the straight line connecting the intersections with the intercepts may be detected as the left and right straight lines.

As described above, the following effects can be obtained according to the present invention.

Firstly, it is possible to detect, reliably and effectively, white lines in the upper region on the road image. This is due to a fact that the line approximation in the upper region can be achieved only by solving a problem of obtaining one parameter, that is, the calculation of the positions, on the horizontal line already detected, of the vanishing point of the left and right straight lines by which the white lines are approximated.

Secondly, it is possible to predict the white line even if either of the left and right white lines is missing in the upper regions on the road image. This is due to a fact that the line approximation in the upper region can be achieved only by solving a problem of obtaining a parameter being common in both left and right white lines, that is, the calculation of the positions, on the horizontal line already detected, of the vanishing points of the left and right approximate straight lines.

Thirdly, it is possible to detect, reliably and effectively, the white lines in the upper region even if the road image is divided into many regions positioned up and down. This is due to a fact that, in the regions other than the regions placed in the lowest position and regions being adjacent thereto, the intersections of straight lines by which the left and right white lines are approximated in the region, are predicted, in order, based on an amount of displacement between two or more intersections on the horizontal line already detected by using the image data placed in a lower position on the road image where it is affected by noise relatively less and the image data on the upper region where the road image is affected much by noise.

It is apparent that the present invention is not limited to the above embodiments but may be changed and modified without departing from the scope and spirit of the invention. For example, each white line may be a virtual white line.

Finally, the present application claims the priority of Japanese Patent Application No. Hei11-249711 filed on Sep. 3, 1999, which is herein incorporated by reference.

What is claimed is:

1. A road marking line detecting system for processing a road image to detect a left side edge marking line and a right side edge marking line of a traveling lane in said road image, said system comprising:

first means for detecting first left and right straight lines by which the left and the right marking lines are approximated in a lowest region of at least two regions positioned up and down on said road image, the regions obtained by dividing said road image;

second means for calculating a horizontal line in a region other than said lowest region in said road image from a first vanishing point, the first vanishing point being an intersection of said first left and right straight lines; and third means for detecting second straight lines, by which the left and the right marking lines are approximated in a region other than said lowest region, by detecting an intersection of said second left and right straight lines on the horizontal line.

2. The road marking line detecting system according to claim 1, wherein said third means comprises means for detecting a second vanishing point on said horizontal line in a region adjacent to said lowest region in said road image, based on intercepts at lowest ends of the second left and right straight lines on said first left and right straight lines, said second vanishing point being the intersection of said second left and right straight lines on said horizontal line.

3. The road white line detecting system according to claim 2, wherein said third means comprises means for predicting an intersection of third left and right straight lines in an upper region other than said lowest region and not adjacent to said lowest region in said road image, based on an amount of displacement on said horizontal line between intersections of straight lines by which left and right marking lines in two or more regions below said upper region are approximated.

4. The road marking line detecting system according to claim 3, further comprising a means for extracting, from said road image, a sequence of points existing on the left and the right marking lines as a sequence of marking line featuring points, together with a marking line filter value showing similarity to said marking line featuring point and wherein said first means comprises a means for detecting straight lines by which said sequence of marking line featuring points is approximated using a least squares method, with weight assigned to said marking line filter value, for left and right sides, as line approximation of marking lines and wherein said third means comprises means for detecting an intersection, on said horizontal line, of left and right second straight lines by which said sequence of marking line featuring points in said region being adjacent to said lowest region is approximated using said least squares method, for both left and right sides, with weight assigned to said marking line filter value and using upper end points, in the lowest region, of said left and right first straight lines as intercepts at lowest ends in said region being adjacent to said lowest region.

5. A road marking line detecting method for processing a road image to detect a left edge marking line and a right edge marking line of a travelling lane in said road image, said method comprising:

detecting first left and right straight lines, by which the left marking line and the right marking line are approximated in a lowest region of at least two regions positioned up and down on said road image, the regions obtained by dividing said road image;

calculating a horizontal line from a first vanishing point, the first vanishing point being an intersection of said first left and right straight lines; and detecting second left and right straight lines, by which the left and right marking lines are approximated in an upper region, the upper region being a region other than said lowest region, by detecting an intersection of the second left and right straight lines on said horizontal line.

6. The road marking line detecting method according to claim 5, wherein said detecting second left and right straight lines comprises detecting a second vanishing point on said horizontal line based on a characteristic that at least in an upper region adjacent to said lowest region, intercepts at lowest ends of second left and right straight lines exist on said first left and right straight lines and that said second vanishing point is the intersection of said second left and right straight lines on said horizontal line, the left and the right marking lines in said region adjacent to said lowest region being approximated based on the second left and right straight lines.

7. The road marking line detecting method according to claim 6, wherein said detecting second left and right straight lines comprises a step of predicting an intersection of straight lines by which the left and the right marking lines are approximated, in an upper region other than said lowest region in said road image and not being adjacent to said lowest region, based on an amount of displacement, on said horizontal line, between intersections of straight lines by which the left and the right marking lines in two or more regions below said upper region are approximated.

8. The road marking line detecting method according to claim 7, further comprising a step of extracting a sequence of points existing on the left and the right marking line image, from said road image, together with a marking line filter value showing similarity to said marking line featuring points as a sequence of marking line featuring points, and wherein said detecting first left and right straight lines comprises a step of detecting straight lines by which said sequence of marking line featuring points is approximated using said least squares method, with weight assigned to said marking line filter value, as line approximation for left and right sides and wherein said detecting second left and right straight lines comprises a step of detecting an intersection, on said horizontal line, of left and right second straight lines by which said sequence of marking line featuring points in said region being adjacent to said lowest region is approximated by using said least squares method, for both left and right sides, with weight assigned to said marking line filter value, and using upper end points of said left and right first straight lines in said lowest region as intercepts at their lowest ends in said region being adjacent to said lowest region.

9. A machine readable storage medium storing a program for processing a road image to detect a left edge road marking line and a right edge road marking line of a travelling lane in the road image said program configured to cause a computer to carry out:

(a) detecting first left and right straight lines by which the left marking line and the right marking line are approximated in a lowest region of at least two regions positioned up and down on a road image, the regions obtained by dividing said road image;

(b) calculating a horizontal line from a first vanishing point, the first vanishing point being an intersection of said first left and right straight lines; and (c) detecting second straight lines by which the left and the right marking lines are approximated in a region other than said lowest region, by detecting an intersection on said horizontal line of the second left and right straight lines by which the left and the right marking lines are approximated in said region other than said lowest region in said road image.

10. The storage medium storing the program for detecting the road marking line according to claim 9, wherein said step (c) comprises detecting a second vanishing point on said horizontal line based on a characteristic that, at least, in a region adjacent to said lowest region of regions other than said lowest region in said road image, intercepts at lowest ends of second left and right straight lines, by which the left and the right marking lines in said region adjacent to said lowest region are approximated, exist on said first left and right straight lines and that said second vanishing point is an intersection on said horizontal line of said second left and right straight lines.

11. The storage medium storing the program for detecting the road marking line according to claim 10, wherein said step (c) comprises a step of predicting an intersection of straight lines by which the left and the right marking lines are approximated, in an upper region other than said lowest region in said road image and not being adjacent to said lowest region, based on an amount of displacement, on said horizontal line, between intersections of straight lines by which the left and the right marking lines in two or more regions below said upper regions are approximated.

12. The storage medium storing the program for detecting the road marking line according to claim 10, wherein said program comprises a program to cause said computer to carry out a step of extracting, from said road image, a sequence of points existing on the left and the right marking lines as a sequence of marking line featuring points, together with a marking line filter value showing similarity to said marking line featuring points and wherein said step (a) comprises process of detecting straight lines by which said sequence of marking line featuring points is approximated using a least squares method, with weight assigned to said marking line filter value, for left and right sides, as line approximation of marking lines and wherein said step (c) comprises a process of detecting an intersection, on said horizontal line, of left and right second straight lines by which said sequence of marking line featuring points in said region being adjacent to said lowest region is approximated, using said least squares method, for both left and right sides, with weight assigned to said marking line filter value and using upper end points, in said lowest region, of said left and right first straight lines as intercepts at their lowest ends in said region being adjacent to said lowest region.

13. A road marking line detecting system for processing a road image to detect a left edge marking line and a right edge marking line of a travelling lane in said road image, said system comprising a computer and a program causing said computer to carry:
 (a) detecting first left and right straight lines, by which the left marking line and the right marking line is approximated in a lowest region of at least two regions positioned up and down in said road image obtained by dividing said road image;
 (b) calculating a horizontal line from a first vanishing point, the first vanishing point being an intersection of said first left and right straight lines; and
 (c) detecting second straight lines by which the left and the right marking lines are approximated in a region other than said lowest region, by detecting on said horizontal line an intersection of the second left and right straight lines, by which the left and the right marking lines are approximated in said region other than said lowest region in said road image.

14. The road marking line detecting system according to claim 13, wherein said step (c) comprises a step of detecting a second vanishing point on said horizontal line based on a characteristic that, at least, in a region being adjacent to said lowest region out of regions other than said lowest region in said road image, intercepts at lowest ends of left and right second straight lines by which the left and the right marking lines in said region being adjacent to said lowest region are approximated, exist on said left and right first straight lines and that said second vanishing point being an intersection of said left and right second straight lines exists on said horizontal line.

15. The road marking line detecting system according to claim 13, wherein said step (c) comprises a step of predicting an intersection of straight lines by which the left and the right marking lines are approximated, in an upper region other than said lowest region in said road image and not being adjacent to said lowest region, based on an amount of displacement, on said horizontal line, between intersections of straight lines by which the left and the right marking lines in two or more regions below said upper regions are approximated.

16. The road marking line detecting system according to claim 13, wherein said program comprises a program to cause said computer to carry out a step of extracting, from said road image, a sequence of points existing on left and right marking lines as a sequence of marking line featuring points, together with a marking line filter value showing similarity to said marking line featuring points and wherein said step (a) comprises a process of detecting straight lines by which said sequence of marking line featuring points is approximated using a least squares method, with weight assigned to said marking line filter value, for left and right sides, as line approximation of marking lines and wherein said step (c) comprises a process of detecting an intersection, on said horizontal line, of left and right second straight lines by which said sequence of marking line featuring points in said region being adjacent to said lowest region is approximated, using said least squares method, for both left and right sides, with weight assigned to said marking line filter value and using upper end points, in said lowest region, of said left and right first straight lines as intercepts at their lowest ends in said region being adjacent to said lowest region.

17. A road marking line detecting system for processing a road image to detect a virtual left edge marking line and a virtual right edge marking line indicating a travelling lane in said road image, said system including a computer and a program causing said computer to carry out:
 (a) detecting first left and right first straight lines by which left and right virtual marking lines are approximated in a lowest region of at least two regions positioned up and down on a road image obtained by dividing said road image;
 (b) calculating a horizontal line from a first vanishing point, the vanishing point being an intersection of said first left and right straight lines; and
 (c) detecting second left and right straight lines by which the left and the right virtual marking lines are approximated in a region other than said lowest region, by detecting on said horizontal line an intersection of the second left and right straight lines, by which the left and the right virtual marking lines are approximated in said region other than said lowest region in said road image.

18. The road marking line detecting system according to claim 17, wherein said step (c) comprises detecting a second vanishing point on said horizontal line based on a characteristic that, at least, in a region adjacent to said lowest region of regions other than said lowest region in said road image, intercepts at lowest ends of the second left and right straight lines, by which the left and the right virtual marking lines in said region being adjacent to said lowest region are approximated, exist on said first left and right straight lines, said second vanishing point being the intersection of said second left and right second straight lines on said horizontal line.

19. The road marking line detecting system according to claim 17, wherein said step (c) comprises a step of predicting an intersection of straight lines by which the left and the right virtual marking lines are approximated, in an upper region other than said lowest region in said road image and not being adjacent to said lowest region, based on an amount of displacement, on said horizontal line, between intersections of straight lines by which the left and the right virtual marking lines in two or more regions below said upper regions are approximated.

20. A road image processor to detect marking lines based on a road image for determining a travelling lane, said processor comprising:

a featuring point extractor configured to construct first left and right straight lines, by which a left marking line and a right marking line are approximated in a lowest region of at least two regions on the road image, the regions obtained by dividing the road image into the lowest region and at least one upper region;

a horizontal line calculator configured to calculate a horizontal line near an upper bound of an upper region in the road image, based on a first vanishing point, the first vanishing point being an intersection of said first left and right straight lines;

an upper region straight line detector configured to detect second left and right straight lines, by which the left marking line and the right marking lines are approximated in the upper region, based on intercepts at the terminal points near a bound of the lowest region of the first left straight line and the first right straight line and based on an intersection of the second left straight line and the second right straight line on the horizontal line, the intersection being a second vanishing point.

21. The road image processor of claim 20, wherein said upper region straight line detector further comprises a vanishing point detector configured to predict another vanishing point at an intersection of third straight lines by which the left marking line and the right marking line are approximated in an upper region other than an upper region adjacent to said lowest region, based on an amount of displacement on the horizontal line, between intersections of second left and right straight lines and first left and right straight lines.

* * * * *